United States Patent

[11] 3,601,845

[72] Inventor Arthur Mavrich
26-67 Ellen Road, Bellmore, N.Y. 11710
[21] Appl. No. 844,901
[22] Filed July 25, 1969
[45] Patented Aug. 31, 1971

[54] SAUSAGE CASING STUFFING APPARATUS
4 Claims, 1 Drawing Fig.
[52] U.S. Cl. .................................................. 17/35,
222/309, 222/335
[51] Int. Cl. .................................................. A22c 11/02
[50] Field of Search .................................................. 17/35, 38,
39; 222/335, 309

[56] References Cited
UNITED STATES PATENTS
2,919,769 1/1960 Burton ........................ 222/335 X
3,162,336 12/1964 Erickson ..................... 222/309
3,422,489 1/1969 Middleton .................... 17/35

FOREIGN PATENTS
485,402 8/1930 Germany..................... 17/35
606,685 12/1934 Germany..................... 17/35

Primary Examiner—Lucie H. Laudenslager
Attorney—Myron Amer

ABSTRACT: A piston-operated sausage casing (or similar container) stuffing apparatus in which the piston is actuated through movement during its power stroke by pressure fluid, such as compressed air, and is then moved back to its ready position, preparatory to another power or casing-stuffing stroke, by the ground meat which is admitted into the apparatus and which is to used for stuffing the next casing. Additionally, the ground meat is preferably pumped under pressure into the apparatus while a slight pressure is applied against the piston as it is being moved into its ready position by the incoming meat, so that the ground meat is subjected to opposing pressures which effectively eliminates any air voids in the ground meat.

PATENTED AUG 31 1971
3,601,845
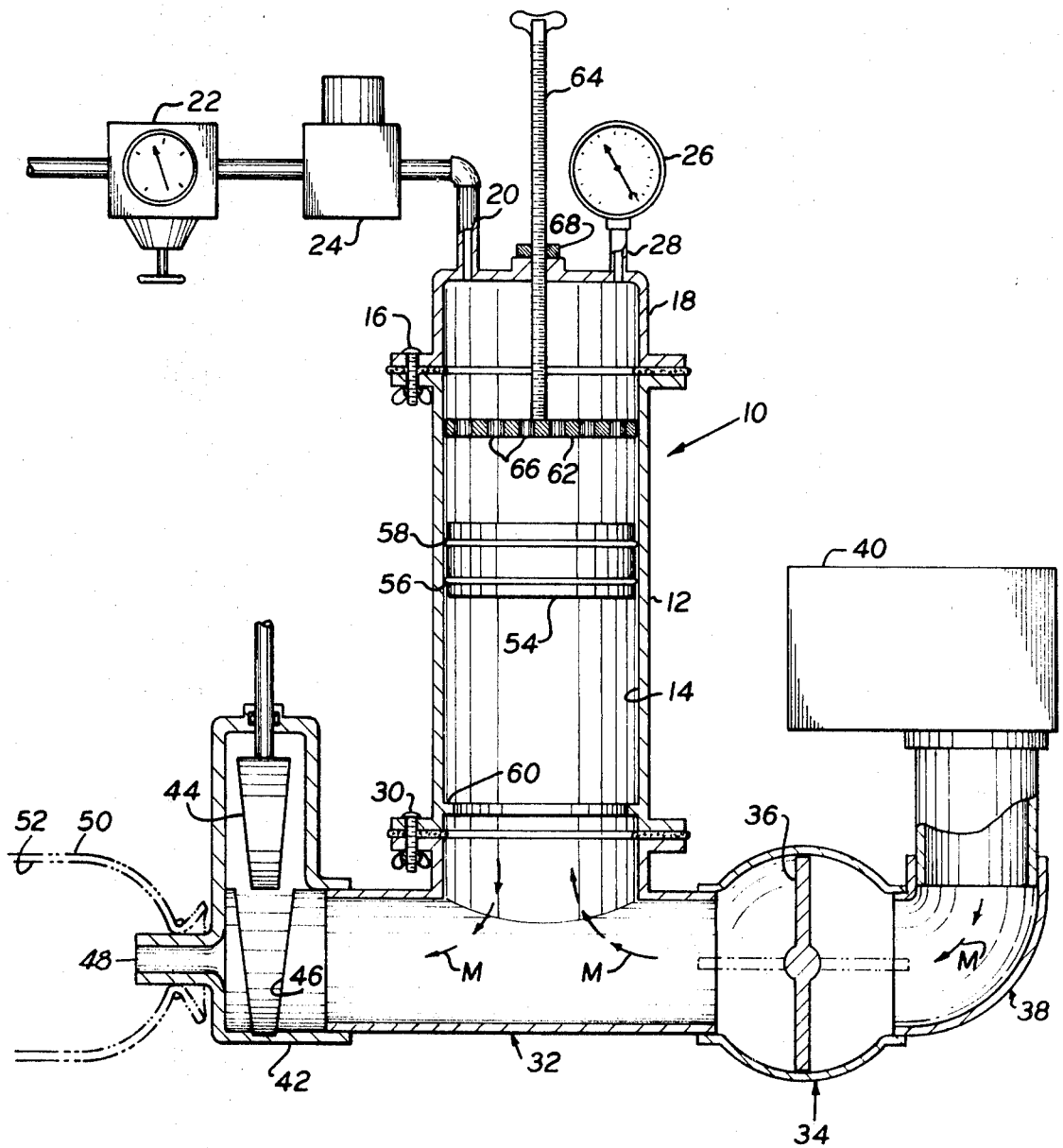
INVENTOR
ARTHUR MAVRICH
BY Myron Amer
ATTORNEY

SAUSAGE CASING STUFFING APPARATUS

The present invention relates generally to sausage or similar food product manufacture, and more particularly to an improved sausage casing stuffing apparatus.

There are currently in use different types of piston-operated apparatus for stuffing sausage casings in which, typically, a piston is actuated by pressure air through a large, elongated piston chamber, previously filled with ground meat, and during such movement is effective in forcing the ground meat into sausage casings. After a power stroke which produces a plurality of stuffed casings, the piston is withdrawn to its initial position and the piston chamber is then charged with an additional quantity of ground meat. This charging or refilling of the apparatus is usually done simply by disconnecting an end wall or housing cover and manually loading the ground meat within the housing, or else pumping the meat into the apparatus with any one of several pumps available for this purpose. While this type of apparatus is effective in producing stuffed sausage casings, it is not entirely satisfactory. Among other shortcomings, there is considerable down time or nonproductive intervals of operation of a typical prior art stuffing apparatus. Specifically, while the time required to attach empty casings to the apparatus and then detach the same when they are full cannot be avoided, nor can the time necessary to recharge the apparatus with a fresh supply of ground meat be avoided, it is not believed necessary for these time delays to be cumulative with the result that a significant portion of the operating interval of the apparatus is unproductive.

Broadly, it is an object of the present invention to provide an improved sausage casing stuffing apparatus which overcomes the foregoing and other shortcomings of the prior art. Specifically, it is an object to provide a sausage-manufacturing apparatus having an improved construction as well as an improved mode of operation which contemplates the performing of the unavoidable, previously noted, operations simultaneously, with the result that the apparatus hereof is capable of a greater productivity than any previously known apparatus.

A sausage casing stuffing apparatus demonstrating objects and advantages of the present invention includes a vertically reciprocating piston within a piston chamber or compartment of a volume selected to be substantially equal to the volume of the sausage which is to be stuffed. During the contemplated mode of operation of the apparatus hereof, the piston is raised to its ready position by the ground meat introduced under pressure into the apparatus. Thereafter, this ground meat is evacuated by the piston during its power stroke into a casing appropriately connected to the housing outlet. This simple cycle is then repeated and a significant time saving results since while the piston is being raised to its ready position the filled sausage is disconnected from the housing outlet and is replaced by an empty sausage casing. Thus, the meat charging operation and the attaching and detaching of the casing are performed simultaneously during a typical interval of operation of the apparatus hereof, and thus nonproductive operation of the apparatus hereof is held to a minimum.

The above brief description, as well as further objects, features and advantages of the present invention, will be more fully appreciated by reference to the following detailed description of a presently preferred, but nonetheless illustrative embodiment with the accompanying drawing, wherein:

The FIGURE of the drawing is a front elevational view of a sausage casing stuffing apparatus according to the present invention, portions of which are in section to better illustrate internal structural features thereof.

The sausage casing stuffing apparatus, generally designated 10, which demonstrates objects and advantages of the present invention includes a vertically oriented cylindrical housing 12 which bounds an internal piston compartment 14. Appropriately connected to the upper end of housing 12, as by circumferentially arranged bolts 16, is a closure or cylinder head 18 which includes a conduit connection 20 to an appropriate source of piston-actuating pressure fluid. In the illustrated embodiment, this pressure or actuating fluid will be understood to be pressure air. To control this pressure air, conduit 20 has connected therein a pressure regulator 22 and a valve 24, which preferably is solenoid operated. Included also is a pressure gauge 26 which communicates through a hollow conduit 28 with the piston chamber 14.

At the opposite end of the housing 12, there is appropriately connected, again by circumferentially spaced bolts 30 or the like, a valve construction, generally designated 32, which controls the flow of ground meat into and out of the piston chamber 14 during use of the apparatus 10 in stuffing casings as is necessary in the production of sausages and similar food products. Valve construction 32, more particularly, includes a meat inlet valve 34, preferably of the butterfly type, having a rotatable valve member 36 which can be rotated between close and open positions as illustrated in full line and phantom line perspective, respectively, in the FIGURE. Connected to the inlet valve 34 is an outlet conduit means 38 of a meat pump 40 which will be understood to be of conventional construction and effective in forcing ground meat or the like from a suitable supply through the open valve 34 into piston compartment 14.

Valve construction 34 has connected at its opposite end, in facing relation to the meat inlet valve 34, a meat outlet valve 42, preferably of the gate type, including a vertically reciprocating valve member 44 which occupies either a closed or an open position with respect to a valve seat 46 and, in this way, effectively regulates movement of meat from the piston compartment 14 to and from the housing outlet 48.

Housing outlet 48 extends laterally from the outlet valve 42 for a sufficient extent to enable the tying or attaching to the outlet 48 of a suitable sausage casing 50 which will be understood to be of a selected size and extent. Specifically, the selected casing volume 52 is that which is related to the ground meat volume or capacity of the piston chamber 14.

At this point in the description, it is convenient to note that in accordance with a contemplated mode of operation of the apparatus 10, that during each cycle of operation of the apparatus it is intended that a casing 50 be stuffed or filled. This mean, therefore, that the casing volume 52 and the piston internal volume 14 that is filled with ground meat should be substantially the same in order to provide this balanced mode of operation. The significance of this will become more apparent during the subsequent description of the mode of operation of the apparatus 10.

Returning to the construction of the apparatus 10, the same includes a vertically reciprocating piston 54. This piston is of conventional construction which includes sealing rings 56 and 58 to minimize the leakage of ground meat past the piston 54 in the operating clearance between it and the internal surface of the housing 12. It will be noted that piston 54 is not attached to a usual piston rod which conventionally extends rearwardly thereof, but that the piston 54 is, in effect, freely floating and movable in opposite directions lengthwise of the piston compartment 14. Downward movement of the piston 54 is limited to abutment or seating against a circumferential ring 60 formed on the inner surface of the housing 12. Movement of the piston upwardly, or in the opposite direction, is possible until abutment of the piston against an adjustable disc or upper piston stop 62. Stop 62 includes a threaded rod 64 which is in threaded engagement with a stationary jamb nut 66 such that threaded engagement of the rod 64 is effective in positioning the stop 64 along the longitudinal axis of the housing 12. Stated another way, piston stop 62 is adjustable in its clearance position from the closure 18 and, depending upon the position it is moved into is effective in determining the volume of ground meat that will fill the piston compartment 14. Piston stop 62 includes plural openings 66 which maintain the communication of the pressure fluid with the piston 54.

A typical sausage-stuffing cycle of operation of the apparatus 10 commences with the introduction of ground meat M into the apparatus. At this time, it will be understood that the piston 54 is in its lowermost position, namely in its seated position on the seat 60. Also, valve member 36 of the butterfly valve 34 is in its open position as illustrated in phantom perspective, the valve member 44 of the gate valve 42 is in its closed position seated in the seat 46, and lastly a casing 50 of an appropriate size and extent is attached to the apparatus outlet 48. In response to operation of the meat pump 40, ground meat M is forced through the meat inlet valve 34 and is effective, since it cannot escape through the outlet valve 42, in raising the piston 54 from the seat 60 and in actuating this piston through movement from the housing end 32 to the housing end 18. Ultimately, the piston 54 is raised against the piston stop 62 which completes its possible movement in an upward direction within the piston compartment 14. The piston 54 at this time is in its ready position. Next, valve 34 is closed, valve 42 opened, and pressure fluid is introduced into the piston compartment 14 through the conduit 20. The introduction of high-pressure air at this time is effective, of course, in actuating the piston 54 downwardly through its power stroke. Ultimately, the piston 54 again is forced into its seated position on the lip 60 thereby terminating its downward movement. However, during movement of the piston 54 in the direction just noted, namely from housing end 18 towards housing end 32, the piston 54 effectively evacuates the meat contents from the piston compartment 14. Specifically, the meat is forced from the compartment 14 through the outlet valve 42 and through the outlet 48 into the casing 50. This results, naturally, in the stuffing of the casing 50 and in the production of a sausage or similar food product. Valve 42 is then closed and valve 34 opened in preparation for the next interval or cycle of operation of the apparatus 10 which, as already noted, contemplates the lifting of the piston 54 into its ready position by the inflowing meat M. It is during this movement of the piston 54 into its ready position that ample time is afforded to the user of the apparatus 10 to remove the full casing 50 from the outlet 48 and to replace this with an empty casing. Thus, there is no significant machine down time loss or delay entailed in the contemplated mode of operation of the apparatus 10.

Still another noteworthy attribute of the apparatus 10 is that during the lifting of the piston 54 by the inflowing meat into its ready position against the piston stop 62, the piston can and is intended to be subjected to a slight back pressure by appropriate regulation of the pressure regulator 22. As a result, the incoming meat M is subjected to opposing pressures during its movement into the piston compartment 14. That, is, it is subjected to the slight pressure which is being exerted on the piston 54 during its upward movement against the piston stop 62 and also by the pressure of the meat pump 40. As a result, air voids in the inflowing meat M are eliminated, for all practical purposes. Thus, the ground meat which is ultimately forced into the casing 50 is substantially a solid mass which is desirable for many reasons, including providing product uniformity.

A latitude of modification, change and substitution is intended in the foregoing disclosure, and in some instances some features of the invention will be employed without a corresponding use of other features.

What is claimed is:

1. A sausage casing stuffing apparatus comprising a housing having a first lower housing end and a second upper housing end bounding a vertically oriented internal piston compartment, an inlet and an outlet respectively in communication with said internal piston compartment located adjacent said first lower housing end, peripheral stop means formed along said internal piston compartment at a selected elevation above said first lower housing end, a source of piston-actuating pressure fluid in communication with said internal piston compartment located adjacent said second upper housing end, and a piston operatively disposed in said internal piston compartment for alternating vertical reciprocating movement through a downward power stroke until abutment against said peripheral stop means and from said stop means through an upward return stroke, said downward power stroke movement being solely in response to an inflowing volume of said pressure fluid and effective to cause the dispensing of meat from said internal piston compartment through said outlet, and said upward return stroke movement being solely in response to meat inflowing into said internal piston compartment through said inlet exerting pressure against said piston, whereby the gradual lifting of said piston during said upward return stroke thereof minimizes the creation of any air voids in said meat inflowing into said internal piston compartment.

2. A sausage casing stuffing apparatus as defined in claim 1 including a pumping means operatively connected to said inlet for flowing meat into said internal piston compartment.

3. A sausage casing stuffing apparatus as defined in claim 2 including means for subjecting said piston to fluid pressure during said return stroke thereof whereby said inflowing meat is compressed under opposing pressures to thereby further minimize any air voids therein.

4. A sausage casing stuffing apparatus as defined in claim 3 including an additional adjustable piston stop means located between said piston and said housing second end, said stop means being adjustably positionable in a selected clearance position from said upper housing end to correspondingly regulate the volume of said internal piston compartment to be filled with inflowing meat.